May 26, 1931.  A. F. MASURY  1,806,695
INDIVIDUAL WHEEL MOUNTING
Filed June 19, 1929
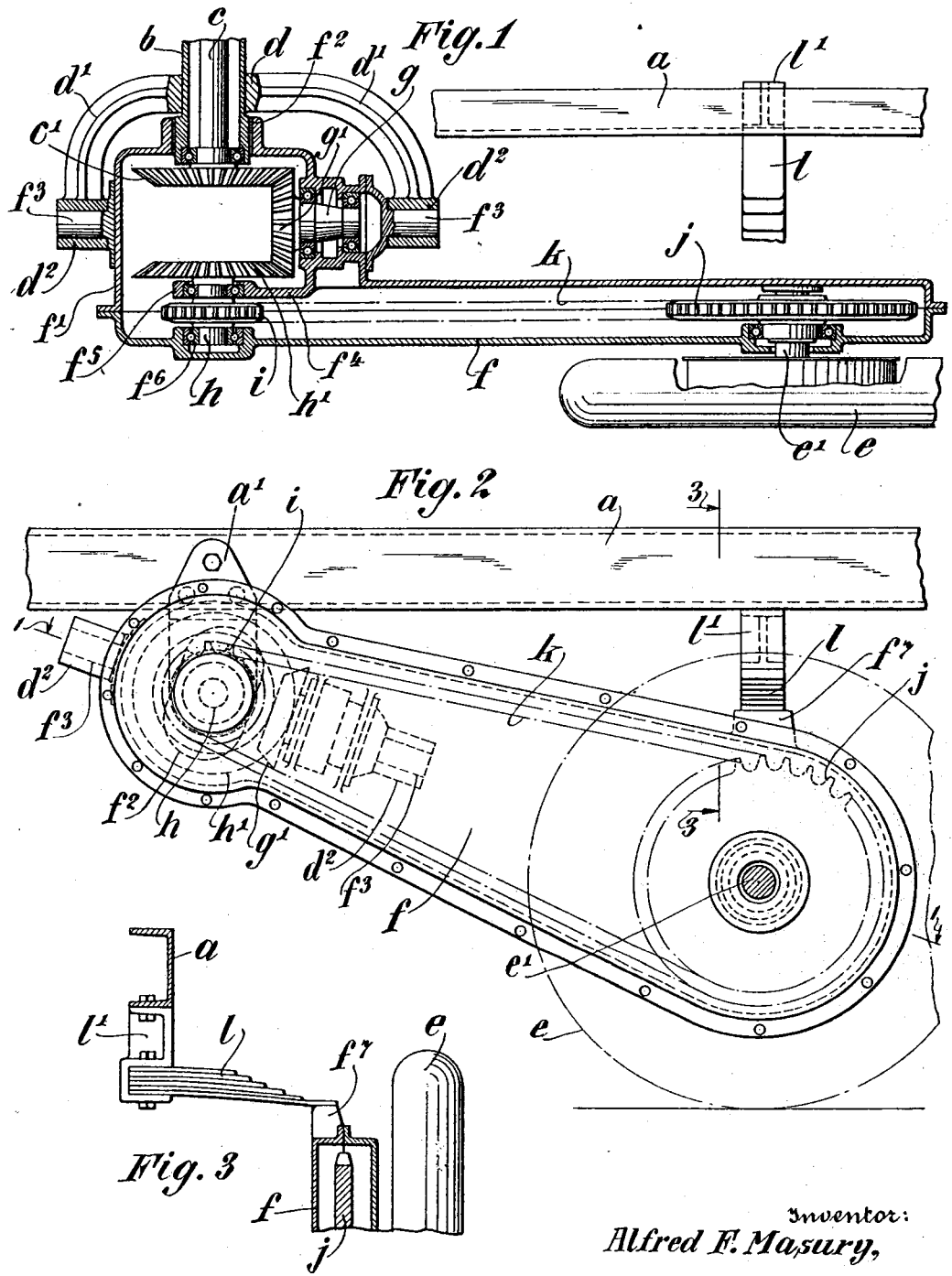
Inventor:
Alfred F. Masury,
By his attorneys:
Redding, Greeley, O'Shea & Campbell Patented May 26, 1931

1,806,695

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

INDIVIDUAL WHEEL MOUNTING

Application filed June 19, 1929. Serial No. 372,088.

The present invention relates to wheel mountings for motor vehicles and embodies, more specifically, an improved form of wheel mounting in which the drive to the wheel is transmitted through the mounting structure.

It is highly desirable in constructions in which wheels are mounted upon a vehicle frame independently of each other and driven individually, that a flexible mounting be provided which not only affords sufficient strength, but also provides the desired degree of flexibility between the wheel and frame. In order that the parts necessary to afford a mounting of such character be properly housed and incorporated in the wheel mounting structure, the design embodied herein has been proposed and serves, effectively, to answer the requirements of rugged service.

An object of the invention, therefore, is to provide a mounting structure for an individual wheel mounting, the drive to the wheel being of such character that relative movement thereof with respect to the frame is readily accommodated.

A further object of the invention is to provide an improved form of mounting for an individually driven wheel, the elements thereof affording ample strength and the drive to the wheel being sufficiently flexible.

A further object of the invention is to provide a drive of the above character in which the wheel mounting may be readily assembled and dismounted from the frame, and the parts thereof easily inspected and serviced without unnecessary difficulty in taking down the parts.

Further objects of the invention will be apparent as it is described in greater detail in connection with the accompanying drawings, wherein:

Figure 1 is a view in longitudinal section taken through a wheel mounting constructed in accordance with the present invention.

Figure 2 is a view in side elevation, showing the wheel mounting of Figure 1.

Figure 3 is a view in section, partly broken away and taken on line 3—3 of Figure 2.

Referring to the above drawings, $a$ designates a vehicle frame carrying a bracket $a'$. This bracket mounts an axle housing $b$ within which a live axle $c$ is journaled.

A bracket $d$ is journaled on the outer periphery of the axle housing and carries arms $d'$ which are formed with aligned bearings $d^2$ at their extremities. A wheel $e$ is mounted on a stub shaft $e'$ which is journaled within a two part housing $f$. This housing $f$ is broken in a vertical plane in such manner that the outer side thereof can be readily dismounted.

The inner housing portion is formed with a head $f'$ having an elongated slot $f^2$ which receives the outer extremity of the axle housing $b$ and permits relative movement of the head $f'$ with respect thereto. Oppositely extending bearing members $f^3$ are secured to the head and are received within the recesses in the extremities $d^2$ of the arms $d'$. It will be seen that the axes of the bearing members $f^3$ pass through the axis of axle $c$ and permit movement of the wheel $e$ transversely of the frame member $a$ about such bearing members.

A stub shaft $g$ is journaled in the head $f'$ and carries a bevel pinion $g'$ which meshes with a bevel gear $c'$ on the extremity of the axle $c$. An inwardly extending web $f^4$ is formed within the inner portion of the housing $f$ and is provided with a bearing $f^5$ which, together with a bearing $f^6$ in the outer portion, mounts a stub shaft $h$. A bevel gear $h'$ is carried by the stub shaft $h$ and meshes with the bevel pinion $g'$.

Driving and driven sprocket wheels $i$ and $j$, are carried by the respective shafts $h$ and $e'$ and a chain $k$, indicated by dot and dash lines in Figures 1 and 2, transmits the drive between the sprocket wheels.

In order to cushion the relative movement between the wheel $e$ and frame $a$, a spring $l$ is mounted in a bracket $l'$ which is secured on the frame. A boss $f^7$ is formed on the housing $f$ and serves as a seat for the outer extremity of the spring $l$.

While the invention has been described with specific reference to the construction shown in the accompanying drawings, it is not to be limited, save as defined in the appended claims.

I claim as my invention:

1. A wheel mounting for a vehicle comprising a frame, a wheel, an axle housing, a housing formed with an offset extension, means to mount the wheel in the last named housing, a web formed in the housing adjacent the extension, means to journal a shaft in the web and an adjacent wall of the housing, trunnions mounted on the extension, bearing arms mounted rotatably on the axle housing, and an elongated aperture in the extension to receive the axle housing.

2. A wheel mounting for a vehicle comprising a frame, a wheel, an axle housing, a housing formed with an offset extension, means to mount the wheel in the last named housing, a web formed in the housing adjacent the extension, means to journal a shaft in the web and an adjacent wall of the housing, and means to mount the extension on the axle housing with provision for movement in a plurality of planes with respect thereto.

3. A wheel mounting for a vehicle comprising a frame, a wheel, an axle housing, a housing formed with an offset extension, means to mount the wheel in the last named housing, trunnions on the extension, a bracket rotatably mounted on the axle housing, arms on the bracket, and bearings in the arms for the trunnions.

4. A wheel mounting for a vehicle comprising a frame, a wheel, an axle housing, a housing formed with an offset extension, means to mount the wheel in the last named housing, trunnions on the extension, bearings mounting the trunnions, and means to mount the bearings on the axle housing with provision for rotative movement with respect thereto.

This specification signed this 12th day of June A. D. 1929.

ALFRED F. MASURY.